United States Patent
Driscoll

(10) Patent No.: US 11,610,117 B2
(45) Date of Patent: Mar. 21, 2023

(54) SYSTEM AND METHOD FOR ADAPTING A NEURAL NETWORK MODEL ON A HARDWARE PLATFORM

(71) Applicant: Tesla, Inc., Austin, TX (US)

(72) Inventor: Michael Driscoll, Mountain View, CA (US)

(73) Assignee: Tesla, Inc., Austin, TX (US)

( * ) Notice: Subject to any disclaimer, the term of this patent is extended or adjusted under 35 U.S.C. 154(b) by 430 days.

(21) Appl. No.: 16/728,884

(22) Filed: Dec. 27, 2019

(65) Prior Publication Data

US 2020/0210832 A1   Jul. 2, 2020

Related U.S. Application Data

(60) Provisional application No. 62/791,220, filed on Jan. 11, 2019, provisional application No. 62/785,363, filed on Dec. 27, 2018.

(51) Int. Cl.
| | |
|---|---|
| *G06N 3/08* | (2006.01) |
| *G06F 17/16* | (2006.01) |
| *G06K 9/62* | (2022.01) |

(52) U.S. Cl.
CPC .............. *G06N 3/08* (2013.01); *G06F 17/16* (2013.01); *G06K 9/6262* (2013.01); *G06K 9/6296* (2013.01)

(58) Field of Classification Search
None
See application file for complete search history.

(56) References Cited

U.S. PATENT DOCUMENTS

| 6,882,755 B2 | 5/2005 | Silverstein et al. |
|---|---|---|
| 7,209,031 B2 | 4/2007 | Nakai et al. |
| (Continued) | | |

FOREIGN PATENT DOCUMENTS

| AU | 2019261735 A1 | 6/2020 |
|---|---|---|
| AU | 2019201716 A1 | 10/2020 |
| (Continued) | | |

OTHER PUBLICATIONS

NetAdapt: Platform aware neural network adaptation for mobile applications, by Yang et al., arXiv:1804.03230v2 [cs.CV] Sep. 28, 2018 (Year: 2018).*

*Primary Examiner* — Vikkram Bali
(74) *Attorney, Agent, or Firm* — Knobbe, Martens, Olson & Bear, LLP

(57) ABSTRACT

Systems and methods for adapting a neural network model on a hardware platform. An example method includes obtaining neural network model information comprising decision points associated with a neural network, with one or more first decision points being associated with a layout of the neural network. Platform information associated with a hardware platform for which the neural network model information is to be adapted is accessed. Constraints associated with adapting the neural network model information to the hardware platform are determined based on the platform information, with a first constraint being associated with a processing resource of the hardware platform and with a second constraint being associated with a performance metric. A candidate configuration for the neural network is generated via execution of a satisfiability solver based on the constraints, with the candidate configuration assigns values to the plurality of decision points.

19 Claims, 2 Drawing Sheets

(56) References Cited

U.S. PATENT DOCUMENTS

| | | |
|---|---|---|
| 7,747,070 B2 | 6/2010 | Puri |
| 7,904,867 B2 | 3/2011 | Burch et al. |
| 7,974,492 B2 | 7/2011 | Nishijima |
| 8,165,380 B2 | 4/2012 | Choi et al. |
| 8,369,633 B2 | 2/2013 | Lu et al. |
| 8,406,515 B2 | 3/2013 | Cheatle et al. |
| 8,509,478 B2 | 8/2013 | Haas et al. |
| 8,588,470 B2 | 11/2013 | Rodriguez et al. |
| 8,744,174 B2 | 6/2014 | Hamada et al. |
| 8,773,498 B2 | 7/2014 | Lindbergh |
| 8,912,476 B2 | 12/2014 | Fogg et al. |
| 8,913,830 B2 | 12/2014 | Sun et al. |
| 8,928,753 B2 | 1/2015 | Han et al. |
| 8,972,095 B2 | 3/2015 | Furuno et al. |
| 8,976,269 B2 | 3/2015 | Duong |
| 9,008,422 B2 | 4/2015 | Eid et al. |
| 9,081,385 B1 | 7/2015 | Ferguson et al. |
| 9,275,289 B2 | 3/2016 | Li et al. |
| 9,586,455 B2 | 3/2017 | Sugai et al. |
| 9,672,437 B2 | 6/2017 | McCarthy |
| 9,710,696 B2 | 7/2017 | Wang et al. |
| 9,738,223 B2 | 8/2017 | Zhang et al. |
| 9,754,154 B2 | 9/2017 | Craig et al. |
| 9,767,369 B2 | 9/2017 | Furman et al. |
| 9,965,865 B1 | 5/2018 | Agrawal et al. |
| 10,133,273 B2 | 11/2018 | Linke |
| 10,140,252 B2 | 11/2018 | Fowers et al. |
| 10,140,544 B1 | 11/2018 | Zhao et al. |
| 10,146,225 B2 | 12/2018 | Ryan |
| 10,152,655 B2 | 12/2018 | Krishnamurthy et al. |
| 10,167,800 B1 | 1/2019 | Chung et al. |
| 10,169,680 B1 | 1/2019 | Sachdeva et al. |
| 10,192,016 B2 | 1/2019 | Ng et al. |
| 10,216,189 B1 | 2/2019 | Haynes |
| 10,228,693 B2 | 3/2019 | Micks et al. |
| 10,242,293 B2 | 3/2019 | Shim et al. |
| 10,248,121 B2 | 4/2019 | VandenBerg, III |
| 10,262,218 B2 | 4/2019 | Lee et al. |
| 10,282,623 B1 | 5/2019 | Ziyaee et al. |
| 10,296,828 B2 | 5/2019 | Viswanathan |
| 10,303,961 B1 | 5/2019 | Stoffel et al. |
| 10,310,087 B2 | 6/2019 | Laddha et al. |
| 10,311,312 B2 | 6/2019 | Yu et al. |
| 10,318,848 B2 | 6/2019 | Dijkman et al. |
| 10,325,178 B1 | 6/2019 | Tang et al. |
| 10,331,974 B2 | 6/2019 | Zia et al. |
| 10,338,600 B2 | 7/2019 | Yoon et al. |
| 10,343,607 B2 | 7/2019 | Kumon et al. |
| 10,359,783 B2 | 7/2019 | Williams et al. |
| 10,366,290 B2 | 7/2019 | Wang et al. |
| 10,372,130 B1 | 8/2019 | Kaushansky et al. |
| 10,373,019 B2 | 8/2019 | Nariyambut Murali et al. |
| 10,373,026 B1 | 8/2019 | Kim et al. |
| 10,380,741 B2 | 8/2019 | Yedla et al. |
| 10,394,237 B2 | 8/2019 | Xu et al. |
| 10,395,144 B2 | 8/2019 | Zeng et al. |
| 10,402,646 B2 | 9/2019 | Klaus |
| 10,402,986 B2 | 9/2019 | Ray et al. |
| 10,414,395 B1 | 9/2019 | Sapp et al. |
| 10,423,934 B1 | 9/2019 | Zanghi et al. |
| 10,436,615 B2 | 10/2019 | Agarwal et al. |
| 10,452,905 B2 | 10/2019 | Segalovitz et al. |
| 10,460,053 B2 | 10/2019 | Olson et al. |
| 10,467,459 B2 | 11/2019 | Chen et al. |
| 10,468,008 B2 | 11/2019 | Beckman et al. |
| 10,468,062 B1 | 11/2019 | Levinson et al. |
| 10,470,510 B1 | 11/2019 | Koh et al. |
| 10,474,160 B2 | 11/2019 | Huang et al. |
| 10,474,161 B2 | 11/2019 | Huang et al. |
| 10,474,928 B2 | 11/2019 | Sivakumar et al. |
| 10,489,126 B2 | 11/2019 | Kumar et al. |
| 10,489,972 B2 | 11/2019 | Atsmon |
| 10,503,971 B1 | 12/2019 | Dang et al. |
| 10,514,711 B2 | 12/2019 | Bar-Nahum et al. |
| 10,528,824 B2 | 1/2020 | Zou |
| 10,529,078 B2 | 1/2020 | Abreu et al. |
| 10,529,088 B2 | 1/2020 | Fine et al. |
| 10,534,854 B2 | 1/2020 | Sharma et al. |
| 10,535,191 B2 | 1/2020 | Sachdeva et al. |
| 10,542,930 B1 | 1/2020 | Sanchez et al. |
| 10,546,197 B2 | 1/2020 | Shrestha et al. |
| 10,546,217 B2 | 1/2020 | Albright et al. |
| 10,552,682 B2 | 2/2020 | Jonsson et al. |
| 10,559,386 B1 | 2/2020 | Neuman |
| 10,565,475 B2 | 2/2020 | Lecue et al. |
| 10,567,674 B2 | 2/2020 | Kirsch |
| 10,568,570 B1 | 2/2020 | Sherpa et al. |
| 10,572,717 B1 | 2/2020 | Zhu et al. |
| 10,574,905 B2 | 2/2020 | Srikanth et al. |
| 10,579,058 B2 | 3/2020 | Oh et al. |
| 10,579,063 B2 | 3/2020 | Haynes et al. |
| 10,579,897 B2 | 3/2020 | Redmon et al. |
| 10,586,280 B2 | 3/2020 | McKenna et al. |
| 10,591,914 B2 | 3/2020 | Palanisamy et al. |
| 10,592,785 B2 | 3/2020 | Zhu et al. |
| 10,599,701 B2 | 3/2020 | Liu |
| 10,599,930 B2 | 3/2020 | Lee et al. |
| 10,599,958 B2 | 3/2020 | He et al. |
| 10,606,990 B2 | 3/2020 | Tull et al. |
| 10,609,434 B2 | 3/2020 | Singhai et al. |
| 10,614,344 B2 | 4/2020 | Anthony et al. |
| 10,621,513 B2 | 4/2020 | Deshpande et al. |
| 10,627,818 B2 | 4/2020 | Sapp et al. |
| 10,628,432 B2 | 4/2020 | Guo et al. |
| 10,628,686 B2 | 4/2020 | Ogale et al. |
| 10,628,688 B1 | 4/2020 | Kim et al. |
| 10,629,080 B2 | 4/2020 | Kazemi et al. |
| 10,636,161 B2 | 4/2020 | Uchigaito |
| 10,636,169 B2 | 4/2020 | Estrada et al. |
| 10,642,275 B2 | 5/2020 | Silva et al. |
| 10,645,344 B2 | 5/2020 | Marman et al. |
| 10,649,464 B2 | 5/2020 | Gray |
| 10,650,071 B2 | 5/2020 | Asgekar et al. |
| 10,652,565 B1 | 5/2020 | Zhang et al. |
| 10,656,657 B2 | 5/2020 | Djuric et al. |
| 10,657,391 B2 | 5/2020 | Chen et al. |
| 10,657,418 B2 | 5/2020 | Marder et al. |
| 10,657,934 B1 | 5/2020 | Kolen et al. |
| 10,661,902 B1 | 5/2020 | Tavshikar |
| 10,664,750 B2 | 5/2020 | Greene |
| 10,671,082 B2 | 6/2020 | Huang et al. |
| 10,671,886 B2 | 6/2020 | Price et al. |
| 10,678,244 B2 | 6/2020 | Iandola et al. |
| 10,678,839 B2 | 6/2020 | Gordon et al. |
| 10,678,997 B2 | 6/2020 | Ahuja et al. |
| 10,679,129 B2 | 6/2020 | Baker |
| 10,685,159 B2 | 6/2020 | Su et al. |
| 10,685,188 B1 | 6/2020 | Zhang et al. |
| 10,692,000 B2 | 6/2020 | Surazhsky et al. |
| 10,692,242 B1 | 6/2020 | Morrison et al. |
| 10,693,740 B2 | 6/2020 | Coccia et al. |
| 10,698,868 B2 | 6/2020 | Guggilla et al. |
| 10,699,119 B2 | 6/2020 | Lo et al. |
| 10,699,140 B2 | 6/2020 | Kench et al. |
| 10,699,477 B2 | 6/2020 | Levinson et al. |
| 10,713,502 B2 | 7/2020 | Tiziani |
| 10,719,759 B2 | 7/2020 | Kutliroff |
| 10,725,475 B2 | 7/2020 | Yang et al. |
| 10,726,264 B2 | 7/2020 | Sawhney et al. |
| 10,726,279 B1 | 7/2020 | Kim et al. |
| 10,726,374 B1 | 7/2020 | Engineer et al. |
| 10,732,261 B1 | 8/2020 | Wang et al. |
| 10,733,262 B2 | 8/2020 | Miller et al. |
| 10,733,482 B1 | 8/2020 | Lee et al. |
| 10,733,638 B1 | 8/2020 | Jain et al. |
| 10,733,755 B2 | 8/2020 | Liao et al. |
| 10,733,876 B2 | 8/2020 | Moura et al. |
| 10,740,563 B2 | 8/2020 | Dugan |
| 10,740,914 B2 | 8/2020 | Xiao et al. |
| 10,748,062 B2 | 8/2020 | Rippel et al. |
| 10,748,247 B2 | 8/2020 | Paluri |
| 10,751,879 B2 | 8/2020 | Li et al. |
| 10,755,112 B2 | 8/2020 | Mabuchi |
| 10,755,575 B2 | 8/2020 | Johnston et al. |

(56) References Cited

U.S. PATENT DOCUMENTS

| | | |
|---|---|---|
| 10,757,330 B2 | 8/2020 | Ashrafi |
| 10,762,396 B2 | 9/2020 | Vallespi et al. |
| 10,768,628 B2 | 9/2020 | Martin et al. |
| 10,768,629 B2 | 9/2020 | Song et al. |
| 10,769,446 B2 | 9/2020 | Chang et al. |
| 10,769,483 B2 | 9/2020 | Nirenberg et al. |
| 10,769,493 B2 | 9/2020 | Yu et al. |
| 10,769,494 B2 | 9/2020 | Xiao et al. |
| 10,769,525 B2 | 9/2020 | Redding et al. |
| 10,776,626 B1 | 9/2020 | Lin et al. |
| 10,776,673 B2 | 9/2020 | Kim et al. |
| 10,776,939 B2 | 9/2020 | Ma et al. |
| 10,779,760 B2 | 9/2020 | Lee et al. |
| 10,783,381 B2 | 9/2020 | Yu et al. |
| 10,783,454 B2 | 9/2020 | Shoaib et al. |
| 10,789,402 B1 | 9/2020 | Vemuri et al. |
| 10,789,544 B2 | 9/2020 | Fiedel et al. |
| 10,790,919 B1 | 9/2020 | Kolen et al. |
| 10,796,221 B2 | 10/2020 | Zhang et al. |
| 10,796,355 B1 | 10/2020 | Price et al. |
| 10,796,423 B2 | 10/2020 | Goja |
| 10,798,368 B2 | 10/2020 | Briggs et al. |
| 10,803,325 B2 | 10/2020 | Bai et al. |
| 10,803,328 B1 | 10/2020 | Bai et al. |
| 10,803,743 B2 | 10/2020 | Abari et al. |
| 10,805,629 B2 | 10/2020 | Liu et al. |
| 10,809,730 B2 | 10/2020 | Chintakindi |
| 10,810,445 B1 | 10/2020 | Kangaspunta |
| 10,816,346 B2 | 10/2020 | Wheeler et al. |
| 10,816,992 B2 | 10/2020 | Chen |
| 10,817,731 B2 | 10/2020 | Vallespi et al. |
| 10,817,732 B2 | 10/2020 | Porter et al. |
| 10,819,923 B1 | 10/2020 | McCauley et al. |
| 10,824,122 B2 | 11/2020 | Mummadi et al. |
| 10,824,862 B2 | 11/2020 | Qi et al. |
| 10,828,790 B2 | 11/2020 | Nemallan |
| 10,832,057 B2 | 11/2020 | Chan et al. |
| 10,832,093 B1 | 11/2020 | Taralova et al. |
| 10,832,414 B2 | 11/2020 | Pfeiffer |
| 10,832,418 B1 | 11/2020 | Karasev et al. |
| 10,833,785 B1 | 11/2020 | O'Shea et al. |
| 10,836,379 B2 | 11/2020 | Xiao et al. |
| 10,838,936 B2 | 11/2020 | Cohen |
| 10,839,230 B2 | 11/2020 | Charette et al. |
| 10,839,578 B2 | 11/2020 | Coppersmith et al. |
| 10,843,628 B2 | 11/2020 | Kawamoto et al. |
| 10,845,820 B2 | 11/2020 | Wheeler |
| 10,845,943 B1 | 11/2020 | Ansari et al. |
| 10,846,831 B2 | 11/2020 | Raduta |
| 10,846,888 B2 | 11/2020 | Kaplanyan et al. |
| 10,853,670 B2 | 12/2020 | Sholingar et al. |
| 10,853,739 B2 | 12/2020 | Truong et al. |
| 10,860,919 B2 | 12/2020 | Kanazawa et al. |
| 10,860,924 B2 | 12/2020 | Burger |
| 10,867,444 B2 | 12/2020 | Russell et al. |
| 10,871,444 B2 | 12/2020 | Al et al. |
| 10,871,782 B2 | 12/2020 | Milstein et al. |
| 10,872,204 B2 | 12/2020 | Zhu et al. |
| 10,872,254 B2 | 12/2020 | Mangla et al. |
| 10,872,326 B2 | 12/2020 | Garner |
| 10,872,531 B2 | 12/2020 | Liu et al. |
| 10,885,083 B2 | 1/2021 | Moeller-Bertram et al. |
| 10,887,433 B2 | 1/2021 | Fu et al. |
| 10,890,898 B2 | 1/2021 | Akella et al. |
| 10,891,715 B2 | 1/2021 | Li |
| 10,891,735 B2 | 1/2021 | Yang et al. |
| 10,893,070 B2 | 1/2021 | Wang et al. |
| 10,893,107 B1 | 1/2021 | Callari et al. |
| 10,896,763 B2 | 1/2021 | Kempanna et al. |
| 10,901,416 B2 | 1/2021 | Khanna et al. |
| 10,901,508 B2 | 1/2021 | Laszlo et al. |
| 10,902,551 B1 | 1/2021 | Mellado et al. |
| 10,908,068 B2 | 2/2021 | Amer et al. |
| 10,908,606 B2 | 2/2021 | Stein et al. |
| 10,909,368 B2 | 2/2021 | Guo et al. |
| 10,909,453 B1 | 2/2021 | Myers et al. |
| 10,915,783 B1 | 2/2021 | Hallman et al. |
| 10,917,522 B2 | 2/2021 | Segalis et al. |
| 10,921,817 B1 | 2/2021 | Kangaspunta |
| 10,922,578 B2 | 2/2021 | Banerjee et al. |
| 10,924,661 B2 | 2/2021 | Vasconcelos et al. |
| 10,928,508 B2 | 2/2021 | Swaminathan |
| 10,929,757 B2 | 2/2021 | Baker et al. |
| 10,930,065 B2 | 2/2021 | Grant et al. |
| 10,936,908 B1 | 3/2021 | Ho et al. |
| 10,937,186 B2 | 3/2021 | Wang et al. |
| 10,943,101 B2 | 3/2021 | Agarwal et al. |
| 10,943,132 B2 | 3/2021 | Wang et al. |
| 10,943,355 B2 | 3/2021 | Fagg et al. |
| 11,263,529 B2 * | 3/2022 | Yoon .................... G06N 3/084 |
| 2003/0035481 A1 | 2/2003 | Hahm |
| 2005/0162445 A1 | 7/2005 | Sheasby et al. |
| 2006/0072847 A1 | 4/2006 | Chor et al. |
| 2006/0224533 A1 | 10/2006 | Thaler |
| 2006/0280364 A1 | 12/2006 | Ma et al. |
| 2009/0016571 A1 | 1/2009 | Tijerina et al. |
| 2010/0118157 A1 | 5/2010 | Kameyama |
| 2012/0109915 A1 | 5/2012 | Kamekawa |
| 2012/0110491 A1 | 5/2012 | Cheung |
| 2012/0134595 A1 | 5/2012 | Fonseca et al. |
| 2015/0104102 A1 | 4/2015 | Carreira et al. |
| 2016/0132786 A1 | 5/2016 | Balan et al. |
| 2016/0328856 A1 | 11/2016 | Mannino et al. |
| 2017/0011281 A1 | 1/2017 | Dijkman et al. |
| 2017/0158134 A1 | 6/2017 | Shigemura |
| 2017/0206434 A1 | 7/2017 | Nariyambut et al. |
| 2018/0012411 A1 | 1/2018 | Richey et al. |
| 2018/0018590 A1 | 1/2018 | Szeto et al. |
| 2018/0039853 A1 | 2/2018 | Liu et al. |
| 2018/0067489 A1 | 3/2018 | Oder et al. |
| 2018/0068459 A1 | 3/2018 | Zhang et al. |
| 2018/0068540 A1 | 3/2018 | Romanenko et al. |
| 2018/0074506 A1 | 3/2018 | Branson |
| 2018/0121762 A1 | 5/2018 | Han et al. |
| 2018/0150081 A1 | 5/2018 | Gross et al. |
| 2018/0211403 A1 | 7/2018 | Hotson et al. |
| 2018/0308012 A1 | 10/2018 | Mummadi et al. |
| 2018/0314878 A1 | 11/2018 | Lee et al. |
| 2018/0357511 A1 | 12/2018 | Misra et al. |
| 2018/0374105 A1 | 12/2018 | Azout et al. |
| 2019/0023277 A1 | 1/2019 | Roger et al. |
| 2019/0025773 A1 | 1/2019 | Yang et al. |
| 2019/0042894 A1 | 2/2019 | Anderson |
| 2019/0042919 A1 | 2/2019 | Peysakhovich et al. |
| 2019/0042944 A1 | 2/2019 | Nair et al. |
| 2019/0042948 A1 | 2/2019 | Lee et al. |
| 2019/0057314 A1 | 2/2019 | Julian et al. |
| 2019/0065637 A1 | 2/2019 | Bogdoll et al. |
| 2019/0072978 A1 | 3/2019 | Levi |
| 2019/0079526 A1 | 3/2019 | Vallespi et al. |
| 2019/0080602 A1 | 3/2019 | Rice et al. |
| 2019/0095780 A1 | 3/2019 | Zhong et al. |
| 2019/0095946 A1 | 3/2019 | Azout et al. |
| 2019/0101914 A1 | 4/2019 | Coleman et al. |
| 2019/0108417 A1 | 4/2019 | Talagala et al. |
| 2019/0122111 A1 | 4/2019 | Min et al. |
| 2019/0130255 A1 | 5/2019 | Yim et al. |
| 2019/0145765 A1 | 5/2019 | Luo et al. |
| 2019/0146497 A1 | 5/2019 | Urtasun et al. |
| 2019/0147112 A1 | 5/2019 | Gordon |
| 2019/0147250 A1 | 5/2019 | Zhang et al. |
| 2019/0147254 A1 | 5/2019 | Bai et al. |
| 2019/0147255 A1 | 5/2019 | Homayounfar et al. |
| 2019/0147335 A1 | 5/2019 | Wang et al. |
| 2019/0147372 A1 | 5/2019 | Luo et al. |
| 2019/0158784 A1 | 5/2019 | Ahn et al. |
| 2019/0180154 A1 | 6/2019 | Orlov et al. |
| 2019/0185010 A1 | 6/2019 | Ganguli et al. |
| 2019/0189251 A1 | 6/2019 | Horiuchi et al. |
| 2019/0197357 A1 | 6/2019 | Anderson et al. |
| 2019/0204842 A1 | 7/2019 | Jafari et al. |
| 2019/0205402 A1 | 7/2019 | Sernau et al. |
| 2019/0205667 A1 | 7/2019 | Avidan et al. |
| 2019/0217791 A1 | 7/2019 | Bradley et al. |

(56) References Cited

U.S. PATENT DOCUMENTS

| | | |
|---|---|---|
| 2019/0227562 A1 | 7/2019 | Mohammadiha et al. |
| 2019/0228037 A1 | 7/2019 | Nicol et al. |
| 2019/0230282 A1 | 7/2019 | Sypitkowski et al. |
| 2019/0235499 A1 | 8/2019 | Kazemi et al. |
| 2019/0236437 A1 | 8/2019 | Shin et al. |
| 2019/0243371 A1 | 8/2019 | Nister et al. |
| 2019/0244138 A1 | 8/2019 | Bhowmick et al. |
| 2019/0250622 A1 | 8/2019 | Nister et al. |
| 2019/0250626 A1 | 8/2019 | Ghafarianzacieh et al. |
| 2019/0250640 A1 | 8/2019 | O'Flaherty et al. |
| 2019/0258878 A1 | 8/2019 | Koivisto et al. |
| 2019/0266418 A1 | 8/2019 | Xu et al. |
| 2019/0266610 A1 | 8/2019 | Ghatage et al. |
| 2019/0272446 A1 | 9/2019 | Kangaspunta et al. |
| 2019/0276041 A1 | 9/2019 | Choi et al. |
| 2019/0279004 A1 | 9/2019 | Kwon et al. |
| 2019/0286652 A1 | 9/2019 | Habbecke et al. |
| 2019/0286972 A1 | 9/2019 | El Husseini et al. |
| 2019/0287028 A1 | 9/2019 | St Amant et al. |
| 2019/0289281 A1 | 9/2019 | Badrinarayanan et al. |
| 2019/0294177 A1 | 9/2019 | Kwon et al. |
| 2019/0294975 A1 | 9/2019 | Sachs |
| 2019/0311290 A1 | 10/2019 | Huang et al. |
| 2019/0318099 A1 | 10/2019 | Carvalho et al. |
| 2019/0325088 A1 | 10/2019 | Dubey et al. |
| 2019/0325266 A1 | 10/2019 | Klepper et al. |
| 2019/0325269 A1 | 10/2019 | Bagherinezhad et al. |
| 2019/0325580 A1 | 10/2019 | Lukac et al. |
| 2019/0325595 A1 | 10/2019 | Stein et al. |
| 2019/0329790 A1 | 10/2019 | Nandakumar et al. |
| 2019/0332875 A1 | 10/2019 | Vallespi-Gonzalez et al. |
| 2019/0333232 A1 | 10/2019 | Vallespi-Gonzalez et al. |
| 2019/0336063 A1 | 11/2019 | Dascalu |
| 2019/0339989 A1 | 11/2019 | Liang et al. |
| 2019/0340462 A1 | 11/2019 | Pao et al. |
| 2019/0340492 A1 | 11/2019 | Burger et al. |
| 2019/0340499 A1 | 11/2019 | Burger et al. |
| 2019/0347501 A1 | 11/2019 | Kim et al. |
| 2019/0349571 A1 | 11/2019 | Herman et al. |
| 2019/0354782 A1 | 11/2019 | Kee et al. |
| 2019/0354786 A1 | 11/2019 | Lee et al. |
| 2019/0354808 A1 | 11/2019 | Park et al. |
| 2019/0354817 A1 | 11/2019 | Shiens et al. |
| 2019/0354850 A1 | 11/2019 | Watson et al. |
| 2019/0370398 A1 | 12/2019 | He et al. |
| 2019/0370575 A1 | 12/2019 | Nandakumar et al. |
| 2019/0370935 A1 | 12/2019 | Chang et al. |
| 2019/0373322 A1 | 12/2019 | Rojas-Echenique et al. |
| 2019/0377345 A1 | 12/2019 | Bachrach et al. |
| 2019/0377965 A1 | 12/2019 | Totolos et al. |
| 2019/0378049 A1 | 12/2019 | Widmann et al. |
| 2019/0378051 A1 | 12/2019 | Widmann et al. |
| 2019/0382007 A1 | 12/2019 | Casas et al. |
| 2019/0384303 A1 | 12/2019 | Muller et al. |
| 2019/0384304 A1 | 12/2019 | Towal et al. |
| 2019/0384309 A1 | 12/2019 | Silva et al. |
| 2019/0384994 A1 | 12/2019 | Frossard et al. |
| 2019/0385048 A1 | 12/2019 | Cassidy et al. |
| 2019/0385360 A1 | 12/2019 | Yang et al. |
| 2020/0004259 A1 | 1/2020 | Gulino et al. |
| 2020/0004351 A1 | 1/2020 | Marchant et al. |
| 2020/0012936 A1 | 1/2020 | Lee et al. |
| 2020/0017117 A1 | 1/2020 | Milton |
| 2020/0025931 A1 | 1/2020 | Liang et al. |
| 2020/0026282 A1 | 1/2020 | Choe et al. |
| 2020/0026283 A1 | 1/2020 | Barnes et al. |
| 2020/0026992 A1 | 1/2020 | Zhang et al. |
| 2020/0027210 A1 | 1/2020 | Haemel et al. |
| 2020/0033858 A1 | 1/2020 | Xiao |
| 2020/0033865 A1 | 1/2020 | Mellinger et al. |
| 2020/0034665 A1 | 1/2020 | Ghanta et al. |
| 2020/0034710 A1 | 1/2020 | Sidhu et al. |
| 2020/0036948 A1 | 1/2020 | Song |
| 2020/0039520 A1 | 2/2020 | Misu et al. |
| 2020/0051550 A1 | 2/2020 | Baker |
| 2020/0060757 A1 | 2/2020 | Ben-Haim et al. |
| 2020/0065711 A1 | 2/2020 | Clément et al. |
| 2020/0065879 A1 | 2/2020 | Hu et al. |
| 2020/0069973 A1 | 3/2020 | Lou et al. |
| 2020/0073385 A1 | 3/2020 | Jobanputra et al. |
| 2020/0074230 A1 | 3/2020 | Englard et al. |
| 2020/0086880 A1 | 3/2020 | Poeppel et al. |
| 2020/0089243 A1 | 3/2020 | Poeppel et al. |
| 2020/0089969 A1 | 3/2020 | Lakshmi et al. |
| 2020/0090056 A1 | 3/2020 | Singhal et al. |
| 2020/0097841 A1 | 3/2020 | Petousis et al. |
| 2020/0098095 A1 | 3/2020 | Borcs et al. |
| 2020/0103894 A1 | 4/2020 | Cella et al. |
| 2020/0104705 A1 | 4/2020 | Bhowmick et al. |
| 2020/0110416 A1 | 4/2020 | Hong et al. |
| 2020/0117180 A1 | 4/2020 | Cella et al. |
| 2020/0117889 A1 | 4/2020 | Laput et al. |
| 2020/0117916 A1 | 4/2020 | Liu |
| 2020/0117917 A1 | 4/2020 | Yoo |
| 2020/0118035 A1 | 4/2020 | Asawa et al. |
| 2020/0125844 A1 | 4/2020 | She et al. |
| 2020/0125845 A1 | 4/2020 | Hess et al. |
| 2020/0126129 A1 | 4/2020 | Lkhamsuren et al. |
| 2020/0134427 A1 | 4/2020 | Oh et al. |
| 2020/0134461 A1 | 4/2020 | Chai et al. |
| 2020/0134466 A1 | 4/2020 | Weintraub et al. |
| 2020/0134848 A1 | 4/2020 | El-Khamy et al. |
| 2020/0143231 A1 | 5/2020 | Fusi et al. |
| 2020/0143279 A1 | 5/2020 | West et al. |
| 2020/0148201 A1 | 5/2020 | King et al. |
| 2020/0149898 A1 | 5/2020 | Felip et al. |
| 2020/0151201 A1 | 5/2020 | Chandrasekhar et al. |
| 2020/0151619 A1 | 5/2020 | Mopur et al. |
| 2020/0151692 A1 | 5/2020 | Gao et al. |
| 2020/0158822 A1 | 5/2020 | Owens et al. |
| 2020/0158869 A1 | 5/2020 | Amirloo et al. |
| 2020/0159225 A1 | 5/2020 | Zeng et al. |
| 2020/0160064 A1 | 5/2020 | Wang et al. |
| 2020/0160104 A1 | 5/2020 | Urtasun et al. |
| 2020/0160117 A1 | 5/2020 | Urtasun et al. |
| 2020/0160178 A1 | 5/2020 | Kar et al. |
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |
| 2020/0160598 A1 | 5/2020 | Manivasagam et al. |
| 2020/0162489 A1 | 5/2020 | Bar-Nahum et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |
| 2020/0192389 A1 | 6/2020 | ReMine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |
| 2020/0202196 A1 | 6/2020 | Guo et al. |
| 2020/0209857 A1 | 7/2020 | Djuric et al. |
| 2020/0209867 A1 | 7/2020 | Valois et al. |
| 2020/0209874 A1 | 7/2020 | Chen et al. |
| 2020/0210717 A1 | 7/2020 | Hou et al. |
| 2020/0210769 A1 | 7/2020 | Hou et al. |
| 2020/0210777 A1 | 7/2020 | Valois et al. |
| 2020/0216064 A1 | 7/2020 | du Toit et al. |
| 2020/0218722 A1 | 7/2020 | Mai et al. |
| 2020/0218979 A1 | 7/2020 | Kwon et al. |
| 2020/0223434 A1 | 7/2020 | Campos et al. |
| 2020/0225758 A1 | 7/2020 | Tang et al. |
| 2020/0226377 A1 | 7/2020 | Campos et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242511 A1 | 7/2020 | Kale et al. |
| 2020/0245869 A1 | 8/2020 | Sivan et al. |

(56) References Cited

U.S. PATENT DOCUMENTS

| | | |
|---|---|---|
| 2020/0249685 A1 | 8/2020 | Elluswamy et al. |
| 2020/0250456 A1 | 8/2020 | Wang et al. |
| 2020/0250515 A1 | 8/2020 | Rifkin et al. |
| 2020/0250874 A1 | 8/2020 | Assouline et al. |
| 2020/0257301 A1 | 8/2020 | Weiser et al. |
| 2020/0257306 A1 | 8/2020 | Nisenzon |
| 2020/0258057 A1 | 8/2020 | Farahat et al. |
| 2020/0265247 A1 | 8/2020 | Musk et al. |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293796 A1 | 9/2020 | Sajjadi et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo et al. |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manivasagam et al. |
| 2020/0302276 A1 | 9/2020 | Yang et al. |
| 2020/0302291 A1 | 9/2020 | Hong |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov et al. |
| 2020/0315708 A1 | 10/2020 | Mosnier et al. |
| 2020/0320132 A1 | 10/2020 | Neumann |
| 2020/0324073 A1 | 10/2020 | Rajan et al. |
| 2020/0327192 A1 | 10/2020 | Hackman et al. |
| 2020/0327443 A1 | 10/2020 | Van et al. |
| 2020/0327449 A1 | 10/2020 | Tiwari et al. |
| 2020/0327662 A1 | 10/2020 | Liu et al. |
| 2020/0327667 A1 | 10/2020 | Arbel et al. |
| 2020/0331476 A1 | 10/2020 | Chen et al. |
| 2020/0334416 A1 | 10/2020 | Vianu et al. |
| 2020/0334495 A1 | 10/2020 | Al et al. |
| 2020/0334501 A1 | 10/2020 | Lin et al. |
| 2020/0334551 A1 | 10/2020 | Javidi et al. |
| 2020/0334574 A1 | 10/2020 | Ishida |
| 2020/0337648 A1 | 10/2020 | Saripalli et al. |
| 2020/0341466 A1 | 10/2020 | Pham et al. |
| 2020/0342350 A1 | 10/2020 | Madar et al. |
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk et al. |
| 2020/0361083 A1 | 11/2020 | Mousavian et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano et al. |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0396394 A1 | 12/2020 | Zlokolica et al. |
| 2020/0398855 A1 | 12/2020 | Thompson |
| 2020/0401850 A1 | 12/2020 | Bazarsky et al. |
| 2020/0401886 A1 | 12/2020 | Deng et al. |
| 2020/0402155 A1 | 12/2020 | Kurian et al. |
| 2020/0402226 A1 | 12/2020 | Peng |
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella et al. |
| 2021/0004663 A1 | 1/2021 | Park et al. |
| 2021/0006835 A1 | 1/2021 | Slattery et al. |
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1 | 1/2021 | McGavran et al. |
| 2021/0030276 A1 | 2/2021 | Li et al. |
| 2021/0034921 A1 | 2/2021 | Pinkovich et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0049378 A1 | 2/2021 | Gautam et al. |
| 2021/0049455 A1 | 2/2021 | Kursun |
| 2021/0049456 A1 | 2/2021 | Kursun |
| 2021/0049548 A1 | 2/2021 | Grisz et al. |
| 2021/0049700 A1 | 2/2021 | Nguyen et al. |
| 2021/0056114 A1 | 2/2021 | Price et al. |
| 2021/0056306 A1 | 2/2021 | Hu et al. |
| 2021/0056317 A1 | 2/2021 | Golov |
| 2021/0056420 A1 | 2/2021 | Konishi et al. |
| 2021/0056701 A1 | 2/2021 | Vranceanu et al. |

FOREIGN PATENT DOCUMENTS

| | | |
|---|---|---|
| CN | 110599537 A | 12/2010 |
| CN | 102737236 A | 10/2012 |
| CN | 103366339 A | 10/2013 |
| CN | 104835114 A | 8/2015 |
| CN | 103236037 B | 5/2016 |
| CN | 103500322 B | 8/2016 |
| CN | 106419893 A | 2/2017 |
| CN | 106504253 A | 3/2017 |
| CN | 107031600 A | 8/2017 |
| CN | 107169421 A | 9/2017 |
| CN | 107507134 A | 12/2017 |
| CN | 107885214 A | 4/2018 |
| CN | 108122234 A | 6/2018 |
| CN | 107133943 B | 7/2018 |
| CN | 1073689268 | 7/2018 |
| CN | 105318888 B | 8/2018 |
| CN | 108491889 A | 9/2018 |
| CN | 108647591 A | 10/2018 |
| CN | 108710865 A | 10/2018 |
| CN | 105550701 B | 11/2018 |
| CN | 108764185 A | 11/2018 |
| CN | 108845574 A | 11/2018 |
| CN | 108898177 A | 11/2018 |
| CN | 109086867 A | 12/2018 |
| CN | 107103113 B | 1/2019 |
| CN | 109215067 A | 1/2019 |
| CN | 109359731 A | 2/2019 |
| CN | 109389207 A | 2/2019 |

(56) References Cited

FOREIGN PATENT DOCUMENTS

| | | |
|---|---|---|
| CN | 109389552 A | 2/2019 |
| CN | 106779060 B | 3/2019 |
| CN | 109579856 A | 4/2019 |
| CN | 109615073 A | 4/2019 |
| CN | 106156754 B | 5/2019 |
| CN | 106598226 B | 5/2019 |
| CN | 106650922 B | 5/2019 |
| CN | 109791626 A | 5/2019 |
| CN | 109901595 A | 6/2019 |
| CN | 109902732 A | 6/2019 |
| CN | 109934163 A | 6/2019 |
| CN | 109948428 A | 6/2019 |
| CN | 109949257 A | 6/2019 |
| CN | 109951710 A | 6/2019 |
| CN | 109975308 A | 7/2019 |
| CN | 109978132 A | 7/2019 |
| CN | 109978161 A | 7/2019 |
| CN | 110060202 A | 7/2019 |
| CN | 110069071 A | 7/2019 |
| CN | 110084086 A | 8/2019 |
| CN | 110096937 A | 8/2019 |
| CN | 110111340 A | 8/2019 |
| CN | 110135485 A | 8/2019 |
| CN | 110197270 B | 9/2019 |
| CN | 110310264 A | 10/2019 |
| CN | 110321965 A | 10/2019 |
| CN | 110334801 A | 10/2019 |
| CN | 110399875 A | 11/2019 |
| CN | 110414362 A | 11/2019 |
| CN | 110426051 A | 11/2019 |
| CN | 110473173 A | 11/2019 |
| CN | 110516665 A | 11/2019 |
| CN | 110543837 A | 12/2019 |
| CN | 110569899 A | 12/2019 |
| CN | 110599864 A | 12/2019 |
| CN | 110619282 A | 12/2019 |
| CN | 110619283 A | 12/2019 |
| CN | 110619330 A | 12/2019 |
| CN | 110659628 A | 1/2020 |
| CN | 110688992 A | 1/2020 |
| CN | 107742311 B | 2/2020 |
| CN | 110751280 A | 2/2020 |
| CN | 110826566 A | 2/2020 |
| CN | 110956185 A | 4/2020 |
| CN | 110966991 A | 4/2020 |
| CN | 111027549 A | 4/2020 |
| CN | 111027575 A | 4/2020 |
| CN | 111047225 A | 4/2020 |
| CN | 1074516598 | 4/2020 |
| CN | 1081118738 | 4/2020 |
| CN | 111126453 A | 5/2020 |
| CN | 111158355 A | 5/2020 |
| CN | 107729998 B | 6/2020 |
| CN | 108549934 B | 6/2020 |
| CN | 111275129 A | 6/2020 |
| CN | 111275618 A | 6/2020 |
| CN | 111326023 A | 6/2020 |
| CN | 111428943 A | 7/2020 |
| CN | 111444821 A | 7/2020 |
| CN | 111445420 A | 7/2020 |
| CN | 111461052 A | 7/2020 |
| CN | 111461053 A | 7/2020 |
| CN | 111461110 A | 7/2020 |
| CN | 110225341 B | 8/2020 |
| CN | 111307162 B | 8/2020 |
| CN | 111488770 A | 8/2020 |
| CN | 111539514 A | 8/2020 |
| CN | 111565318 A | 8/2020 |
| CN | 111582216 A | 8/2020 |
| CN | 111598095 A | 8/2020 |
| CN | 111693972 A | 9/2020 |
| CN | 1082295268 | 9/2020 |
| CN | 106558058 B | 10/2020 |
| CN | 107169560 B | 10/2020 |
| CN | 107622258 B | 10/2020 |
| CN | 111767801 A | 10/2020 |
| CN | 111768002 A | 10/2020 |
| CN | 111783545 A | 10/2020 |
| CN | 111783971 A | 10/2020 |
| CN | 111797657 A | 10/2020 |
| CN | 111814623 A | 10/2020 |
| CN | 111814902 A | 10/2020 |
| CN | 111860499 A | 10/2020 |
| CN | 111881856 A | 11/2020 |
| CN | 111882579 A | 11/2020 |
| CN | 111897639 A | 11/2020 |
| CN | 111898507 A | 11/2020 |
| CN | 111898523 A | 11/2020 |
| CN | 111899227 A | 11/2020 |
| CN | 112101175 A | 12/2020 |
| CN | 112101562 A | 12/2020 |
| CN | 112115953 A | 12/2020 |
| CN | 111062973 B | 1/2021 |
| CN | 111275080 B | 1/2021 |
| CN | 112183739 A | 1/2021 |
| CN | 112232497 A | 1/2021 |
| CN | 112288658 A | 1/2021 |
| CN | 112308095 A | 2/2021 |
| CN | 112308799 A | 2/2021 |
| CN | 112313663 A | 2/2021 |
| CN | 112329552 A | 2/2021 |
| CN | 112348783 A | 2/2021 |
| CN | 111899245 B | 3/2021 |
| DE | 202017102235 U1 | 5/2017 |
| DE | 202017102238 U1 | 5/2017 |
| DE | 102017116017 A1 | 1/2019 |
| DE | 102018130821 A1 | 6/2020 |
| DE | 102019008316 A1 | 8/2020 |
| EP | 1215626 B1 | 9/2008 |
| EP | 2228666 B1 | 9/2012 |
| EP | 2420408 B1 | 5/2013 |
| EP | 2723069 A1 | 4/2014 |
| EP | 2741253 A1 | 6/2014 |
| EP | 3115772 A1 | 1/2017 |
| EP | 2618559 B1 | 8/2017 |
| EP | 3285485 A1 | 2/2018 |
| EP | 2863633 B1 | 2/2019 |
| EP | 3113080 B1 | 5/2019 |
| EP | 3525132 A1 | 8/2019 |
| EP | 3531689 A1 | 8/2019 |
| EP | 3537340 A1 | 9/2019 |
| EP | 3543917 A1 | 9/2019 |
| EP | 3608840 A1 | 2/2020 |
| EP | 3657387 A1 | 5/2020 |
| EP | 2396750 B1 | 6/2020 |
| EP | 3664020 A1 | 6/2020 |
| EP | 3690712 A1 | 8/2020 |
| EP | 3690742 A1 | 8/2020 |
| EP | 3722992 A1 | 10/2020 |
| EP | 3690730 A2 | 11/2020 |
| EP | 3739486 A1 | 11/2020 |
| EP | 3501897 B1 | 12/2020 |
| EP | 3751455 A2 | 12/2020 |
| EP | 3783527 A1 | 2/2021 |
| GB | 2402572 B | 8/2005 |
| GB | 2548087 A | 9/2017 |
| GB | 2577485 A | 4/2020 |
| GB | 2517270 B | 6/2020 |
| JP | 2578262 Y2 | 8/1998 |
| JP | 3941252 B2 | 7/2007 |
| JP | 4282583 B2 | 6/2009 |
| JP | 4300098 B2 | 7/2009 |
| JP | 2015004922 A | 1/2015 |
| JP | 5863536 B2 | 2/2016 |
| JP | 6044134 B2 | 12/2016 |
| JP | 6525707 B2 | 6/2019 |
| JP | 2019101535 A | 6/2019 |
| JP | 2020101927 A | 7/2020 |
| JP | 2020173744 A | 10/2020 |
| KR | 100326702 B1 | 2/2002 |
| KR | 101082878 B1 | 11/2011 |
| KR | 101738422 B1 | 5/2017 |
| KR | 101969864 B1 | 4/2019 |
| KR | 101996167 B1 | 7/2019 |

(56) References Cited

FOREIGN PATENT DOCUMENTS

| | | |
|---|---|---|
| KR | 102022388 B1 | 8/2019 |
| KR | 102043143 B1 | 11/2019 |
| KR | 102095335 B1 | 3/2020 |
| KR | 102097120 B1 | 4/2020 |
| KR | 1020200085490 A | 7/2020 |
| KR | 102189262 B1 | 12/2020 |
| KR | 1020200142266 A | 12/2020 |
| TW | 200630819 A | 9/2006 |
| TW | I294089 B | 3/2008 |
| TW | I306207 B | 2/2009 |
| WO | WO 02/052835 | 7/2002 |
| WO | WO 16/032398 | 3/2016 |
| WO | WO 16/048108 | 3/2016 |
| WO | WO 16/207875 | 12/2016 |
| WO | WO 17/158622 | 9/2017 |
| WO | WO 19/005547 | 1/2019 |
| WO | WO 19/067695 | 4/2019 |
| WO | WO 19/089339 | 5/2019 |
| WO | WO 19/092456 | 5/2019 |
| WO | WO 19/099622 | 5/2019 |
| WO | WO 19/122952 | 6/2019 |
| WO | WO 19/125191 | 6/2019 |
| WO | WO 19/126755 | 6/2019 |
| WO | WO 19/144575 | 8/2019 |
| WO | WO 19/182782 | 9/2019 |
| WO | WO 19/191578 | 10/2019 |
| WO | WO 19/216938 | 11/2019 |
| WO | WO 19/220436 | 11/2019 |
| WO | WO 20/006154 | 1/2020 |
| WO | WO 20/012756 | 1/2020 |
| WO | WO 20/025696 | 2/2020 |
| WO | WO 20/034663 | 2/2020 |
| WO | WO 20/056157 | 3/2020 |
| WO | WO 20/076356 | 4/2020 |
| WO | WO 20/097221 | 5/2020 |
| WO | WO 20/101246 | 5/2020 |
| WO | WO 20/120050 | 6/2020 |
| WO | WO 20/121973 | 6/2020 |
| WO | WO 20/131140 | 6/2020 |
| WO | WO 20/139181 | 7/2020 |
| WO | WO 20/139355 | 7/2020 |
| WO | WO 20/139357 | 7/2020 |
| WO | WO 20/142193 | 7/2020 |
| WO | WO 20/146445 | 7/2020 |
| WO | WO 20/151329 | 7/2020 |
| WO | WO 20/157761 | 8/2020 |
| WO | WO 20/163455 | 8/2020 |
| WO | WO 20/167667 | 8/2020 |
| WO | WO 20/174262 | 9/2020 |
| WO | WO 20/177583 | 9/2020 |
| WO | WO 20/185233 | 9/2020 |
| WO | WO 20/185234 | 9/2020 |
| WO | WO 20/195658 | 10/2020 |
| WO | WO 20/198189 | 10/2020 |
| WO | WO 20/198779 | 10/2020 |
| WO | WO 20/205597 | 10/2020 |
| WO | WO 20/221200 | 11/2020 |
| WO | WO 20/240284 | 12/2020 |
| WO | WO 20/260020 | 12/2020 |
| WO | WO 20/264010 | 12/2020 |

* cited by examiner

- Traversing a neural network model to identify decision points S210
- Identifying configuration constraints S220
- Determining candidate configurations for the neural network S230
- Receiving candidate configurations S240
- Determining that the candidate configurations are satisfiable S250
- Determining a configuration that satisfies target performance metrics S260

FIGURE 2

SYSTEM AND METHOD FOR ADAPTING A NEURAL NETWORK MODEL ON A HARDWARE PLATFORM

INCORPORATION BY REFERENCE TO ANY PRIORITY APPLICATIONS

This application claims priority to U.S. Prov. App. No. 62/785,363 filed on Dec. 27, 2018 and titled "SYSTEM AND METHOD FOR ADAPTING A NEURAL NETWORK MODEL ON A HARDWARE PLATFORM," and further claims priority to U.S. Prov. App. No. 62/791,220 filed on Jan. 11, 2019 and titled "SYSTEM AND METHOD FOR ADAPTING A NEURAL NETWORK MODEL ON A HARDWARE PLATFORM," the disclosures of which are hereby incorporated herein by reference in their entirety.

Any and all applications for which a foreign or domestic priority claim is identified in the Application Data Sheet as filed with the present application are hereby incorporated by reference under 37 CFR 1.57.

BACKGROUND

Field of the Invention

This specification relates generally to the machine learning field, and more specifically to a new and useful system and method for adapting a neural network model on a platform.

Description of the Related Art

Neural networks are being increasingly relied upon for disparate problems due to, as an example, the ease at which they can label, or otherwise classify, input data. For example, a neural network may be used to assign an object label to a portion of an input image. An example portion of an input image may depict a person and a neural network may therefore assign a 'person' label to this example portion. A neural network may be defined, at least in part, by different combinations of hyperparameters and parameters. Example hyperparameters may include a number of layers, activation functions, number of neurons per layer, techniques for training a neural network, and so on. Example parameters may include information learned during training, such as values of weights, biases, and so on. Commonly, different neural networks with differing hyperparameters are trained. These different neural networks are then used to analyze the same validation training set and a particular neural network is selected for future use based on the desired performance or accuracy goals of the particular application.

For machine learning applications, it may often be desirable to implement and/or configure neural networks on previously-unimplemented platforms (e.g., software/hardware combination). However, implementing or configuring a neural network for a given platform and/or application (e.g., a use case) can be extremely difficult, because different neural networks, hardware components, software, and/or applications may have different requirements which impose complex constraints on the configuration. For example, autonomous vehicles may be constrained to implement neural networks for their artificial intelligence systems using a relatively limited set of hardware implemented in the vehicle itself, which may lead to hardware platform constraints in terms of implementation and performance. Increasingly, there is also a demand for machine learning and deep learning on mobile devices such as smart phones and tablets. In order to enable deep learning and other processing-heavy and computationally intensive techniques, the neural network model used must be adapted to generate configurations that satisfy all constraints of the platform in question.

This satisfiability problem can be complex and require a significant amount of time, energy, and resources to explore manually by a developer or administrator of the system implementing the neural network model. For example, there may be many "decision points" at which a choice must be made from many options for each configuration variable, which may drastically increase the number of potential configurations usable for a given platform. There are many decisions to make about which algorithms to implement, which data layout to implement, which of many options to select for each decision point, and more. All of these decisions have an impact on whether the neural network will run on the platform, the network performance (e.g., evaluation time, memory usage, power usage, etc.), the accuracy and performance of the neural network model, or other neural network metrics. In addition, a decision at any given decision point in this process may often cause the configuration to be invalid, given other constraints imposed at other decision points, and determining this satisfiability or unsatisfiability requires research and calculation. For example, using a deep learning library or software development kit (SDK) such as NVIDIA's CUDA Deep Neural Network library (cuDNN) requires manually consulting the documentation at every decision point to explore the implications of each option at a decision point.

SUMMARY

One embodiment is a method implemented by a system of one or more processors. The method may include: obtaining neural network model information comprising a plurality of decision points associated with a neural network, wherein one or more first decision points are associated with a layout of the neural network; accessing platform information associated with a hardware platform for which the neural network model information is to be adapted; determining, based on the platform information, constraints associated with adapting the neural network model information to the hardware platform, wherein a first constraint is associated with a processing resource of the hardware platform and wherein a second constraint is associated with a performance metric; and generating a candidate configuration for the neural network via execution of a satisfiability solver based on the constraints, wherein the candidate configuration assigns values to the plurality of decision points.

Another embodiment is a system comprising one or more processors and non-transitory computer storage media storing instructions that when executed by the one or more processors, cause the one or more processors to perform operations including: obtaining neural network model information comprising a plurality of decision points associated with a neural network, wherein one or more first decision points are associated with a layout of the neural network; accessing platform information associated with a hardware platform for which the neural network model information is to be adapted; determining, based on the platform information, constraints associated with adapting the neural network model information to the hardware platform, wherein a first constraint is associated with a processing resource of the hardware platform and wherein a second constraint is associated with a performance metric; and generating a candidate configuration for the neural network via execution of a satisfiability solver based on the constraints, wherein the candidate configuration assigns values to the plurality of decision points.

Yet another embodiment is a non-transitory computer storage media storing instructions that when executed by a system of one or more processors, cause the one or more processors to perform operations including: obtaining neural network model information comprising a plurality of decision points associated with a neural network, wherein one or more first decision points are associated with a layout of the neural network; accessing platform information associated with a hardware platform for which the neural network model information is to be adapted; determining, based on the platform information, constraints associated with adapting the neural network model information to the hardware platform, wherein a first constraint is associated with a processing resource of the hardware platform and wherein a second constraint is associated with a performance metric; and generating a candidate configuration for the neural network via execution of a satisfiability solver based on the constraints, wherein the candidate configuration assigns values to the plurality of decision points.

BRIEF DESCRIPTION OF THE DRAWINGS

FIG. 2 is a flowchart representation of an example model configuration method.

DETAILED DESCRIPTION

Figure 1:
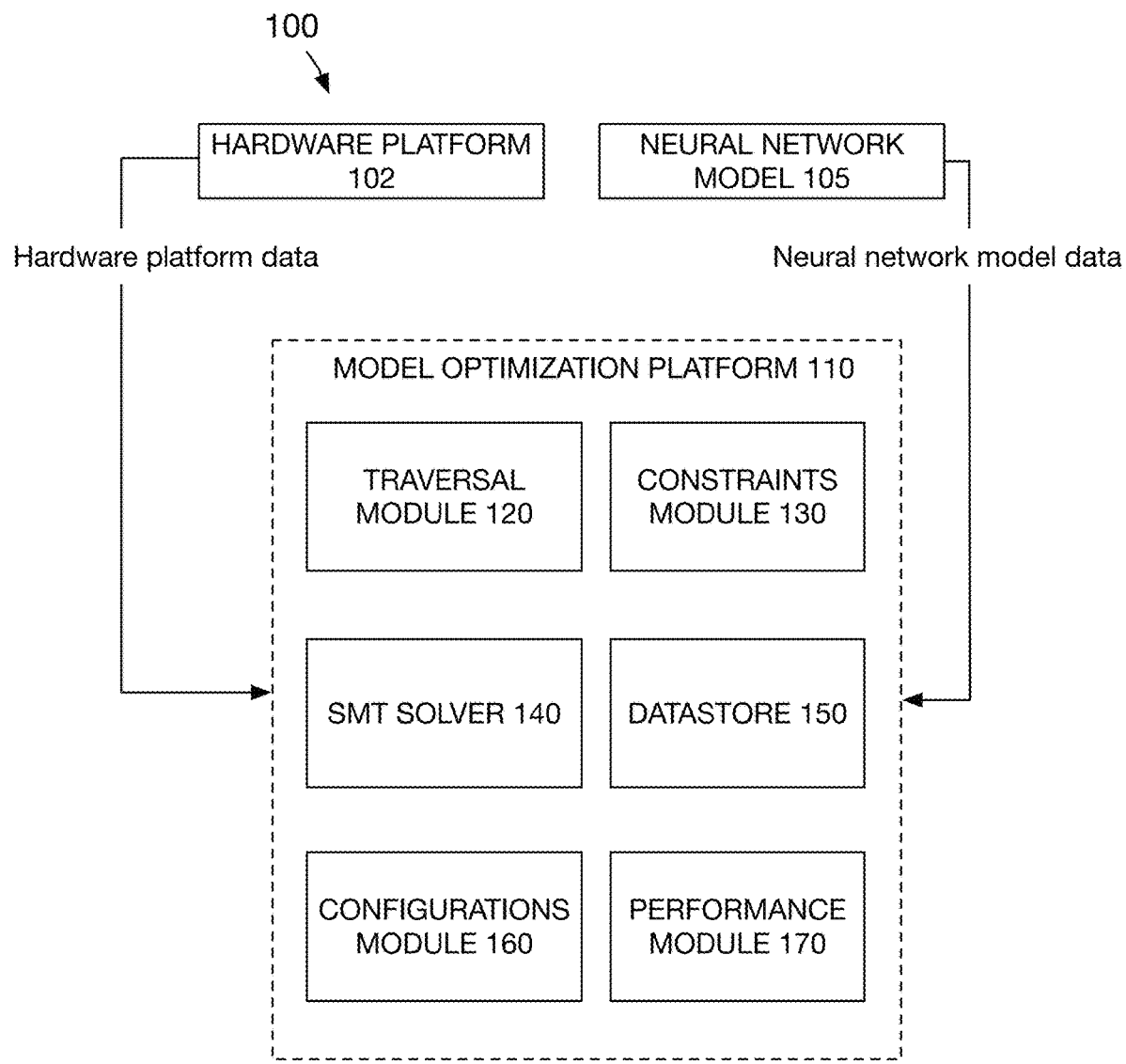
FIG. 1 is a schematic representation of an example model configuration system.

The following description of the embodiments of the disclosed technology is not intended to limit the disclosed technology to these particular embodiments, but rather to enable any person skilled in the art to make and use the disclosed technology.

Although embodiments described throughout generally relate to systems and methods for neural network model adaption and configuration, it will be appreciated by those skilled in the art that the systems and methods described can be implemented and/or adapted for a variety of purposes within the machine learning and/or deep learning fields or for neural networks generally.

Introduction

In an embodiment, techniques, systems, and methods, are described to determine a neural network configuration which is adapted to a specific platform. An example platform may represent a processing architecture, an amount of memory, and so on as described herein. Additionally, a platform may represent a particular cloud or virtual machine architecture or instance. It may be appreciated that different platforms may complicate the implementation of a neural network. For example, a certain graphics processing unit architecture may allow for specific instructions to be executed. In this example, a neural network configuration may be determined which leverages these instructions. As another example, a certain lower-powered processing architecture may have limited memory. In this example, a neural network configuration may be determined which is able to work within this limited memory.

As will be described, satisfiability techniques (e.g., constraint satisfaction techniques) may be used to determine a configuration of a neural network based on received input information associated with a hardware or software platform. Example input information may include different configurations, decision points, platform information, and so on. Advantageously, example solvers may be employed to rapidly determine the configuration of the current platform. An example solver may be a satisfiability modulo theories (SMT) solver. This example solver may use techniques, such as Davis-Putnam-Logemann-Loveland (DPLL) algorithms, Boolean Satisfiability Problem (SAT) techniques, Shostak's method, Nelsen-Oppen approaches, and/or combinations thereof. In this way, a neural network may be rapidly adapted to different platforms.

Overview

One embodiment of a system and method includes: using a constraint satisfaction method to determine a set of candidate configurations, based on a neural network (e.g., a representation thereof), a set of possible choices at each decision point, and a set of constraints (e.g., for a platform, the network, the use case, user-imposed, etc.). In variants, the system and method for model adaption and configuration can include: traversing the neural network to identify one or more decision points, each represented by a "configuration variable" requiring a valid value; identifying one or more constraints between/among variables specified by the hardware platform for each of the variables of the decision points; identifying one or more model constraints specified by the hardware platform for the neural network model; identifying one or more performance constraints for operating the neural network model on the hardware platform; executing a satisfiability modulo theories (SMT) solver for the neural network model, wherein the variable constraints, model constraints, and performance constraints are inputs for the SMT solver; receiving one or more candidate configurations from the SMT solver; for each of the received candidate configurations, determining that the candidate configuration is satisfiable; and determining a configuration from a number of received candidate configurations that satisfies target performance metrics.

The system and method function to traverse the neural network model, determine configuration variables (and/or decision points) and network constraints; to identify valid candidate configurations using a constraint satisfaction solver (e.g., an SMT solver, a SAT solver, etc.), given a set of auxiliary constraints; and optionally to select a configuration or configurations that satisfy one or more target performance metrics. Generating a functionally correct, valid implementation of a neural network, such as a deep neural network (DNN) can be a primary aim as a result. Additionally or alternatively, the system and method can output a platform selection (e.g., a hardware selection, a software selection), a neural network selection (e.g., select the neural network to use from a set of candidate networks), or determine any other suitable parameter.

In order to produce a concrete implementation of an abstract neural network, a number of implementation decisions about one or more of system's data layout, numerical precision, algorithm selection, data padding, accelerator use, stride, and more may be made. These decisions may be made on a per-layer or per-tensor basis, so there can potentially be hundreds of decisions, or more, to make for a particular network. Embodiments of the invention take many factors into account before implementing the neural network because many configurations are not supported by underlying software or hardware platforms, and such configurations will result in an inoperable implementation.

As an illustration of one potential challenge, configuring a convolution layer using the NVIDIA CUDA® Deep Neural Network library (cuDNN) (NVIDIA Corporation), which is a library of primitives for deep neural networks, may include the following decisions:

Input tensor: datatype (2+ options), layout (2+ options), padding (4 options).
Output tensor: datatype, layout, padding.
Filter: datatype, layout, padding.
Algorithm: 10 options.
Precision: 2 options (16-bit or 32-bit floating point arithmetic).
Hardware: 2 options (CUDA cores or tensor cores).

Although this example of a convolution presents a large space of possible configurations, many configurations are invalid because they are not implemented by the neural network software development kit (SDK), such as cuDNN and/or constituent layers. Furthermore, the validity of many configurations depends on the convolution parameters; some convolution algorithms don't support certain convolution types or methods (e.g., strided convolutions), and some hardware platforms require specific sizes of tensors. The problem is even more challenging in a convolutional network, where choices have implications across neighbors. For example, the layout of a producer's output tensor should match the layout of a consumer's input tensor.

The systems and methods described herein seek to select a neural network model configuration that satisfies all constraints by, in one embodiment, enumerating a list of valid configurations by casting the configuration problem as a satisfiability problem, and using a constraint satisfaction solver (e.g., an SMT solver) to identify valid configurations for the particular platform where the neural network will run.

All or portions of the method can be performed at a predetermined frequency, performed upon occurrence of an execution event or triggering condition, or performed at any suitable time.

System

As shown in FIG. 1, the model configuration system 100 can include: a hardware platform 102, a neural network model 105, a model configuration platform 110, a traversal module 120, a constraints module 130, a constraint satisfaction solver 140 (e.g., SMT solver 140), a datastore 150, a configurations module 160, and a performance module 170.

All or portions of the system 100 can be implemented in: a local computing system, a remote computing system (e.g., cloud computing system, AWS, and so on), or at any other suitable computing location. The remote computing system can belong to or be maintained by an entity or organization, an individual, a third-party system, or any other suitable user or operator of a computing system. The system 100 may represent a system of one or more processors, one or more computers, one or more virtual machines executing on one or more computers, and so on.

In variants, the model configuration platform 110 functions to facilitate communication between various components of the system (e.g., between the neural network model and the datastore, the hardware platform and the constraints module, etc.), but can additionally or alternatively perform any other suitable functionality. The model configuration platform can additionally or alternatively host or execute the other components of the system (e.g., the neural network model). The model configuration platform 110 can be: a computer system, a network of computer systems, a set of processing systems (e.g., processors, ASICs, etc.), or otherwise configured.

The neural network model 105 functions as a representation of a neural network. In some embodiments, the neural network model 105 is a model of a neural network (for which a configuration is to be determined) that is stored or implemented on the same computer device as the model configuration platform 110, while in other embodiments the neural network model 105, hardware platform 102, and model configuration platform 110 are all components of separate computer devices. In some embodiments, the neural network model 105 can represent one of a plurality of candidate models stored by the system. Any combination of components and computer devices may be contemplated.

In some embodiments, the neural network model 105 may represent a deep learning neural network or set of neural networks, non-deep learning neural network(s), or a combination of deep learning and non-deep learning neural networks. In some embodiments, the neural network model 105 is capable of performing or executing tasks related to machine learning and/or deep learning techniques.

In some embodiments, the neural network model 105 can be a graph (e.g., a directed acyclic graph), wherein each graph node can represent a layer and each edge can represent a tensor (e.g., input/output tensor). However, the neural network model 105 can be otherwise represented for analysis. Each node and/or edge can be associated with one or more layer or tensor: identifiers, constraints, requirements, variables that need values, or any other suitable information. The neural network model 105 can be automatically generated (e.g., from neural network code, such as Python, TensorFlow, Keras, and so on), manually generated, or otherwise generated.

The hardware platform 102 can be a computing system, network, or other hardware embodiment that is targeted for a possible hosting or implementation of the neural network model 105. The hardware platform 102 can be associated with hardware platform data (e.g., stored in a hardware characterization database), which can be sent to the model configuration platform 110. The hardware platform data can include one or more constraints of the hardware platform (e.g., constraints on the configuration variables, such as the maximum or required tensor size, the number of parallel tasks that can be performed, the memory availability, etc.).

The traversal module 120 operates to traverse the neural network model 105 to identify one or more decision points. In some embodiments, each of the decision points include at least one variable (configuration variable) requiring a valid value. In some embodiments, the traversal module 120 identifies the decision points by identifying at least one of the variables and determining a choice, option, decision path, branching point, and/or potential modification of the variable. In some embodiments, traversing the neural network model includes stepping through each of the steps in the neural network model one by one in order. In some cases, traversal includes testing or evaluating one or more boundaries or edge cases of the steps in the neural network model. In some embodiments, traversing the neural network model includes stepping through the neural network model (e.g., graph), identifying the variables for each layer (node), identifying the variables for each tensor (edge), and determining constraints between the layers and/or tensors (e.g., the tensors for preceding and successive layers must match).

Examples of decision points in the neural network module may include:
a. tensor10_layout=LayoutChoice(NCHW, NHWC, . . . )
b. conv3-alg=ConvAlgChoice(GEMM, PRECOMP_GEMM, FFT, WINOGRAD, . . . )
c. tensor10_shape0=3

Constraints module 130 operates to identify one or more constraints for adapting the neural network model 105 to the hardware platform 102. In some embodiments, the constraints module 130 identifies one or more variable constraints specified by the hardware platform for the neural network model, specific to the variable being implemented on the hardware platform. In some embodiments, the constraints module 130 identifies one or more model constraints specified by the hardware platform for the neural network model, specific to the neural network model being implemented on the hardware platform. Example hardware constraints may relate to a processing resource of the hardware platform, such as memory size, cache size, processor information (e.g., speed), instructions capable of being implemented, and so on. In some embodiments, the constraints module 130 identifies one or more performance constraints specified by the hardware platform for operating the neural network model on the hardware platform, including any constraints required by one or more low-level processors of the hardware platform.

For example, constraints among variables that are imposed by the hardware platform may include such constraints as:

a. Variable constraint: require((conv3_alg==GEMM)→(conv3_hardware==CudaCores))
b. Model constraint: require ((conv3_hardware==TensorCores) (tensor10_shape0%8==0))
c. Model constraint: require (tensor10_layout==tensor12_layout)
d. Performance constraint for running on Tensor Cores: require(conv3_hardware==TensorCores)

Additionally or alternatively, the constraints module 130 can specify software constraints (e.g., imposed by the operating system, etc.), use-case constraints, or any other suitable constraints. Constraints can include: a specific set of variable values that can be used (e.g., for a given piece of software, use case, etc.), variable relationships, or any other suitable set of constraints. The constraints can be determined: from a standards guide, from an API (e.g., for the software, hardware, etc.), received from a user (e.g., manually specified), obtained via automated performance of an internet or web-based, search, or otherwise determined.

The constraint satisfaction solver 140 operates to execute a constraint satisfaction method to determine values for the configuration variables (e.g., decision points). The constraint satisfaction solver is preferably an SMT solver that executes a satisfiability modulo theories (SMT) solving method for the neural network model, with the one or more identified constraints (including, e.g., variable constraints, model constraints, and/or performance constraints) and variable value options being fed into or ingested by the SMT solver 140 as inputs. In some embodiments, other suitable solvers may be used and fall within the scope of the disclosure herein. The variable value options can be: all values available for the given variable (e.g., all algorithm options for a given layer, all data types for a given data format, etc.); only values permitted by the constraints (e.g., only tensor lengths available for the given piece of hardware, such that the neural network may fit in memory); or be any other suitable set of value options. The variable value options can be: retrieved from a global database, retrieved from a database for the hardware or software, received from a user, or otherwise determined. In some embodiments, the SMT solver analyzes the configuration variables at the decision points, the available value options for each of the configuration variables, and the constraints (e.g., to the variables, model, and performance). The SMT solver then finds an assignment value for each the configuration variables that satisfies all of the constraints. In variants, the set of valid configuration variable values can be considered a "configuration" for the neural network. If constructed correctly, the result is a valid working configuration of the neural network model adapted to operate on the hardware platform. In some embodiments, the SMT solver provides the variable values to one or more operators or administrators of the model configuration platform 110, neural network model 105 and/or hardware platform 102, and the operators or administrators can manually or semi-manually declare variables from within the network, software, or hardware configuration. In some embodiments, the variables can be a specific format such as enumerations (e.g., one of four different values), integers, and more. In some embodiments, a list of variables is generated, and constraints between the variables are added to the list, and the list is ingested by the SMT solver.

In some embodiments, the variables are analyzed in terms of data layouts for one or more tensors that can include many values. In some embodiments, such tensors are not assigned variable values manually. In some embodiments, if a tensor is encountered by the SMT solver, the SMT solver includes a numerical value for the tensor, such as an integer in order for the tensor to be cache-compatible or cache-resident, or compatible with other elements.

In some embodiments, the SMT solver outputs a candidate configuration. If the candidate configuration is satisfiable (e.g., as determined by the configurations module 160), then the candidate configuration can be considered (e.g., labeled) a valid configuration, and stored for further analysis. In this variation, a new constraint, excluding the valid configuration can be added, and the SMT solver can be re-run with the new constraint. This can enable the system and method to successively generate multiple valid configurations for further analysis. In this variation, running successive solver instances on the problem (e.g., combination of constraint variables, value options, and constraints) can be halted when: no valid configurations are output (e.g., the problem is unsatisfiable), a predetermined number of valid configurations are generated, the valid configurations satisfy a performance metric (e.g., evaluation time, power consumption, memory consumption, etc. falls below a threshold value, etc.), or when any other suitable condition is satisfied. For example, when the SMT solver outputs a valid configuration, the system then adds the configuration to the set of constraints in a negated sense. The SMT solver method is then run again, and another valid configuration is generated from the negated valid configuration. Alternatively or additionally, multiple solver instances can be concurrently run on the problem, wherein valid configurations output by the instances can be subsequently compared and analyzed.

In some embodiments, the neural network model includes a number of convolutional algorithms that can be chosen. For example, for libraries such as cuDNN, certain algorithms may imply certain layouts or decisions. When one element or parameter is modified, an invalid configuration may result. If the SMT solver produces a layout for a tensor, then the SMT solver ensures that all variables within the configuration are compatible with the layout throughout the entire network.

The datastore 150 of the system may include one or more databases in which neural network data, hardware platform data, constraints, valid configurations, target performance metrics, configurations that satisfy one or more of the target performance metrics, neural network variables, and other pieces of data can be stored. The data can be: determined by the system (e.g., calculated, learned, etc. from data retrieved, received, or otherwise collected from, e.g., the neural network model 105 and/or the hardware platform 102), received from a user, operator or administrator, retrieved from an external database or remote network or computing system, or otherwise determined. In some embodiments, the datastore also stores output from the SMT solver, including analysis results and configuration information. Other various data or entities may be stored.

The configurations module 160 operates to receive one or more candidate configurations from the SMT solver, and, for each of the received candidate configurations, determine that the candidate configuration is satisfiable (e.g., all configuration variables have a value that satisfies all constraints; that all variables within every decision point are compatible within the neural network model and when operating on the hardware platform; etc.). In some embodiments, the configurations module 150 records the candidate configuration as valid upon such a determination, and stores it in the database 150.

In some embodiments, if the candidate configuration is unsatisfiable, the analysis ends there. In some embodiments, the configurations module 160 optionally inspects data in an "unsat core" within the SMT solver for insight into the minimum set of constraints that couldn't be satisfied. In some embodiments, overconstraint is possible in terms of so many constraints being ingested by the SMT solver that no satisfactory working configuration is possible. In some embodiments, the SMT solver can be configured to provide the unsat core data for manual removal or tweaking.

The performance module 170 operates to determine a "good" configuration (e.g., fast, low power, efficient memory usage, etc.) from a number of received candidate configurations, where the "good" configuration satisfies all constraints, and satisfies one or more target performance metrics. The performance module 170 can use one or more of: one or more target performance metrics, a set of rules, a set of heuristics, and/or an automated empirical search for "good" configurations. In some embodiments, a decision tree is used for heuristics analysis and/or the empirical search in order to determine a potentially more optimal configuration. In one variation, the performance module 170 can run the neural network with each valid configuration on the platform (e.g., using a test set of data, such as images), gather and/or receive target performance metrics, and compare the target performance metrics for each valid configuration run to select a "good" configuration (e.g., configuration that has the shortest evaluation time, consumes the least amount of power, consumes the least amount of memory, generates the least amount of heat, is the most accurate and/or otherwise performant, etc.). However, the performance module 170 can select a valid configuration for deployment (from the set of valid configurations output by the SMT solver), in any other suitable manner.

In some embodiments, additional constraints are added automatically or manually to determine one or more matching configurations that are labeled as "good" configurations. For example, if the hardware platform 102 is an accelerator, additional constraints can be imposed such as requiring data to be 16-bit floating points. Adding more data points will, in many cases, reduce the number of valid configurations and lead to a smaller number of potentially more optimized configurations that satisfy all constraints. In some embodiments, a metric is used or determined for a configuration that satisfies one or more target performance metrics, such as shortest evaluation time of the neural network model (e.g., time frame for a solution), lowest amount of power used, memory optimization, throughput optimization, and more. In some embodiments, such metrics include a threshold for the metric that must be met in order for a valid configuration to be labeled as a configuration that satisfies one or more of the target performance metrics.

In some embodiments, metrics such as accuracy are orthogonal or secondary considerations in determining a configuration that satisfies one or more target performance metrics, while in other embodiments they may be primary considerations such that a threshold accuracy must be exceeded in order for a configuration that satisfies the target performance metrics to be determined.

In some embodiments, once a potentially more optimized configuration is determined, the value assignments for the variables that were determined to constitute a configuration that satisfies the target performance metrics are propagated to the neural network model for operation on the hardware platform 102 or other hardware platform.

In some embodiments, an example embodiment of the system 100 or model configuration platform 110 can include a script, such as a python script, that ingests the neural network model data, constructs an SMT solver, traverses the network, declares variables and constraints, executes the SMT solver, receives assignments to the variables from the SMT solver based on a configuration that satisfies one or more target performance metrics, and then propagates the assigned values for the variables back to the neural network model.

In some embodiments, analysis results, graph visualizations, and other output can be provided via an interactive graphical user interface (GUI) such as a dashboard for neural network model operators and/or administrators. The GUI may be presented by a user device or the system 100. For example, the system 100 may generate the GUI or the user device may present the GUI and receive information from the system 100 for inclusion in the GUI. In some embodiments, the GUI allows for interaction with layers and edges between layers, and a user may be able to add constraints and remove constraints. In some embodiments, an output includes a representation of the neural network model as a graph, such as a directed acyclic graph. For example, one or more candidate configurations may be presented in the GUI. User input, such as user input to update constraints and/or adjust a neural network, may cause triggering of the SMT solver. As an example, the SMT solver may determine an updated candidate configuration.

Example Flowchart

FIG. 2 is a flowchart representation of the object detection method.

S210 includes traversing a neural network model to identify decision points, as described above with respect to the traversal module 120.

S220 includes identifying variable constraints, model constraints and performance constraints, as described above with respect to the constraints module 130.

S230 includes executing an SMT solver for the neural network model, as described above with respect to the SMT solver 140.

The method can optionally include, S240, which includes receiving candidate configurations, as described above with respect to the configurations module 160.

S250 includes determining that the candidate configurations are satisfiable, as described above with respect to the configurations module 160.

S260 includes determining a configuration that satisfies one or more target performance metrics, as described above with respect to the performance module 170.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Additional Embodiments

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method implemented by a system of one or more processors, the method comprising:
obtaining neural network model information comprising a plurality of decision points associated with a neural network, wherein one or more first decision points are associated with a layout of the neural network;
accessing platform information associated with a hardware platform for which the neural network model information is to be adapted;
determining, based on the platform information, constraints associated with adapting the neural network model information to the hardware platform, wherein a first constraint is associated with a processing resource of the hardware platform and wherein a second constraint is associated with a performance metric; and
generating a candidate configuration for the neural network via execution of a satisfiability solver based on the constraints, wherein the candidate configuration assigns values to the plurality of decision points,
wherein the determined constraints are updated to include the candidate configuration as a negation, and wherein one or more other candidate configurations are generated based on the updated constraints.

2. The method of claim 1, wherein one of the first decision points is associated with a tensor size, and wherein the candidate configuration selects a value of the tensor size based on the determined constraints, such that the tensor size is configured to fit in memory of the hardware platform.

3. The method of claim 1, wherein one or more other decision points are associated with one or more of numerical precision, algorithm selection, data padding, accelerator use, or stride.

4. The method of claim 1, wherein the neural network model information is associated with a directed graph, and wherein determining the decision points comprises:
traversing the directed graph, wherein decision points are identified for each node and edge of the directed graph.

5. The method of claim 1, wherein a performance metric comprises one or more of evaluation time, power consumption, or memory consumption.

6. The method of claim 1, wherein a third constraint is associated with adapting the neural network to a software platform, and wherein the third constraint relates to an operating system executing on the hardware platform.

7. The method of claim 1, further comprising:
selecting an output candidate configuration based on analyzing the candidate configuration and the one or more other candidate configurations,
wherein input data is provided to the candidate configuration and the one or more other candidate configurations, and wherein the output candidate configuration is selected based on performance metrics associated with the candidate configuration and the one or more other candidate configurations.

8. The method of claim 1, further comprising:
successively generating a plurality of candidate configurations, wherein each of the plurality of candidate configurations assigns different values to the decision points; and
halting generation of successive candidate configuration, wherein halting is based on a threshold number of candidate configurations being generated, the satisfiability solver indicates unsatisfiability, or a performance metric is below a threshold.

9. The method of claim 1, further comprising generating an interactive user interface, wherein the interactive user interface:
presents a dashboard presenting the candidate configuration; and
responds to user input associated with updating the determined constraints, wherein the satisfiability solver is triggered to determine an updated candidate configuration based on the user input.

10. The method of claim 1, wherein the satisfiability solver is a satisfiability modulo theories solver.

11. A system comprising one or more processors and non-transitory computer storage media storing instructions that when executed by the one or more processors, cause the one or more processors to perform operations comprising:
obtaining neural network model information comprising a plurality of decision points associated with a neural network, wherein one or more first decision points are associated with a layout of the neural network;
accessing platform information associated with a hardware platform for which the neural network model information is to be adapted;
determining, based on the platform information, constraints associated with adapting the neural network model information to the hardware platform, wherein a first constraint is associated with a processing resource of the hardware platform and wherein a second constraint is associated with a performance metric; and
generating a candidate configuration for the neural network via execution of a satisfiability solver based on the constraints, wherein the candidate configuration assigns values to the plurality of decision points,
wherein the determined constraints are updated to include the candidate configuration as a negation, and wherein one or more other candidate configurations are generated based on the updated constraints.

12. The system of claim 11, wherein one of the first decision points is associated with a tensor size, and wherein the candidate configuration selects a value of the tensor size based on the determined constraints, such that the tensor size is configured to fit in memory of the hardware platform.

13. The system of claim 11, wherein the neural network model information is associated with a directed graph, and wherein determining the decision points comprises:
traversing the directed graph, wherein decision points are identified for each node and edge of the directed graph.

14. The system of claim 11, wherein a performance metric comprises one or more of evaluation time, power consumption, or memory consumption.

15. The system of claim 11, wherein the operations further comprise:
selecting an output candidate configuration based on analyzing the candidate configuration and the one or more other candidate configurations,
wherein input data is provided to the candidate configuration and the one or more other candidate configurations, and wherein the output candidate configuration is selected based on performance metrics associated with the candidate configuration and the one or more other candidate configurations.

16. The system of claim 11, wherein the operations further comprise generating an interactive user interface, wherein the interactive user interface:
presents a dashboard presenting the candidate configuration; and
responds to user input associated with updating the determined constraints, wherein the satisfiability solver is triggered to determine an updated candidate configuration based on the user input.

17. Non-transitory computer storage media storing instructions that when executed by a system of one or more processors, cause the one or more processors to perform operations comprising:
obtaining neural network model information comprising a plurality of decision points associated with a neural network, wherein one or more first decision points are associated with a layout of the neural network;
accessing platform information associated with a hardware platform for which the neural network model information is to be adapted;
determining, based on the platform information, constraints associated with adapting the neural network model information to the hardware platform, wherein a first constraint is associated with a processing resource of the hardware platform and wherein a second constraint is associated with a performance metric; and
generating a candidate configuration for the neural network via execution of a satisfiability solver based on the constraints, wherein the candidate configuration assigns values to the plurality of decision points,
wherein the determined constraints are updated to include the candidate configuration as a negation, and wherein one or more other candidate configurations are generated based on the updated constraints.

18. The non-transitory computer storage media of claim 17, wherein one of the first decision points is associated with a tensor size, and wherein the candidate configuration selects a value of the tensor size based on the determined constraints, such that the tensor size is configured to fit in memory of the hardware platform.

19. The non-transitory computer storage media of claim 17, wherein the operations further comprise generating an interactive user interface, wherein the interactive user interface:
- presents a dashboard presenting the candidate configuration; and
- responds to user input associated with updating the determined constraints, wherein the satisfiability solver is triggered to determine an updated candidate configuration based on the user input.

* * * * *